(12) United States Patent
Grems et al.

(10) Patent No.: US 7,758,787 B2
(45) Date of Patent: Jul. 20, 2010

(54) MULTI-SHOT INJECTION MOLDED COMPONENT AND METHOD OF MANUFACTURE

(75) Inventors: Lisa A. Grems, West Bloomfield, MI (US); Dana M. Jones, Goodrich, MI (US); Daniel V. Beckley, Fenton, MI (US); Daniel E. Wenglinski, Livonia, MI (US); Manfred Fritsch, Ringgold, GA (US); Thomas G. Bailey, Highland, MI (US); Larry Gaudreau, North Berwick, ME (US)

(73) Assignee: Intier Automotive Inc., Aurora, Ontario (CA)

( * ) Notice: Subject to any disclaimer, the term of this patent is extended or adjusted under 35 U.S.C. 154(b) by 1332 days.

(21) Appl. No.: 10/517,168

(22) PCT Filed: Jun. 2, 2003

(86) PCT No.: PCT/US03/17446

§ 371 (c)(1),
(2), (4) Date: Sep. 26, 2005

(87) PCT Pub. No.: WO03/103924

PCT Pub. Date: Dec. 18, 2003

(65) Prior Publication Data

US 2006/0049030 A1        Mar. 9, 2006

Related U.S. Application Data

(60) Provisional application No. 60/386,988, filed on Jun. 7, 2002.

(51) Int. Cl.
B29C 45/14        (2006.01)
B29C 45/16        (2006.01)
B29C 70/76        (2006.01)
B29C 70/78        (2006.01)

(52) U.S. Cl. ...................... 264/250; 264/129; 264/255; 264/267; 264/294

(58) Field of Classification Search ...................... None
See application file for complete search history.

(56) References Cited

U.S. PATENT DOCUMENTS 4,442,055 A        4/1984    Oelsch (Continued)

FOREIGN PATENT DOCUMENTS

| DE | 198 10 312 A1 | 9/1999 |
| FR | 2348037 | 10/1977 |
| WO | WO 96 25282 | 8/1996 |

*Primary Examiner*—Edmund H. Lee
(74) *Attorney, Agent, or Firm*—Honigman Miller Schwartz and Cohn LLP

(57) ABSTRACT

An automotive component (10) and a method for manufacturing the same are disclosed. The component (10) comprises a core portion (14) formed of a first material and a second portion (18) integral with the core portion (14) and formed of a second material. In one illustrated embodiment, the first and second materials have different material property characteristics. For example, the first material can be made of a relatively harder plastic material than the second material made of a softtouch plastic material. The method for manufacturing the component comprises the steps of injecting the first material into a first cavity of a mold to form the core portion (14), altering the mold cavity to form a second cavity and injecting the second material into the second cavity while the first material is in a reactive state to form the second portion (18) of the component. Because the first material is in the reactive state, the second material is integrally formed with the first material.

16 Claims, 4 Drawing Sheets

U.S. PATENT DOCUMENTS

| | | | |
|---|---|---|---|
| 4,459,256 A * | 7/1984 | Ziegler | 264/152 |
| 4,732,724 A * | 3/1988 | Sterner | 264/251 |
| 5,448,028 A * | 9/1995 | Filion et al. | 200/52 R |
| 5,458,361 A * | 10/1995 | Gajewski | 280/728.3 |
| 5,947,511 A * | 9/1999 | Usui et al. | 280/728.3 |
| 6,093,900 A * | 7/2000 | Wisskirchen et al. | 200/302.2 |
| 6,348,169 B1 | 2/2002 | Stipes et al. | |
| 6,737,596 B1 * | 5/2004 | Hein | 200/310 |

\* cited by examiner

MULTI-SHOT INJECTION MOLDED COMPONENT AND METHOD OF MANUFACTURE

TECHNICAL FIELD

The present invention relates to an automotive component and a method of manufacturing the component, and in particular to a component formed with two different integrally-formed materials having different material property characteristics.

BACKGROUND OF THE INVENTION

Interior door panels serve many functions in the operation of an automobile. First and foremost, the door panel provides an L-shaped support for an arm of a passenger traveling in the vehicle. Typically, the horizontal portion of the door panel comprises an armrest and the vertical portion comprises a bolster. These portions may be formed from a variety of different materials including vinyl, cloth, plastic or leather. Certain materials, such as leather, provide a softer feel and are more comfortable to the passenger. However, these materials are more expensive. Rougher materials, such as hard plastic, are less expensive and easier to manipulate into the armrest and bolster of the door panels. The door panels made of plastic can easily be formed by traditional injection molding techniques.

Another function of the interior door panel is to provide switches for electronically controlling features such as power door locks, power windows, and power mirrors. Traditional door panels provide an aperture for receiving a switching mechanism having a plurality of switches for controlling the power features. This technique produces a variety of quality control problems. First, the non-integral switches produce fit and finish problems, including difficulties controlling buzzes, squeaks and rattles generated by the switching mechanism. Additionally, because the switches are not integral and reside in the aperture of the door panel, a gap remains once the switching mechanism is installed. This gap allows contaminants to invade the switching mechanism thereby producing failures of the power features of the vehicle after prolonged exposure to the contaminants.

Finally, the interior door panels of a vehicle provide an aesthetic function to the vehicle. The door is one of the first features a passenger observes when entering a vehicle. Furthermore, people spend increasing amounts of time in their vehicles each day and expect the interiors of their vehicles to be functional, comfortable and pleasing to their eyes. Similarly, designers of automotive interiors are continually striving to produce fresh, unique design to please their customers. Traditional door panels are generally one solid monotone color. Perhaps with a cloth covering, the panels will receive a pattern or contrasting color.

There remains a need in the automotive industry to create a component, such as a door panel, in which the armrests and bolsters are easy and inexpensive to manufacture yet provide a soft and comfortable feel to the vehicle passenger. In addition, there remains a need to produce a door panel that includes an accessory, such as a switching mechanism, in which quality control concerns are reduced and the door panels are easily and inexpensively produced. Further, there remains a need in the automotive industry to produce door panels using an inexpensive, easily manufactured alternative that provides flexibility in the design and color schemes of vehicle interiors.

SUMMARY OF THE INVENTION

The inventors of the present invention have recognized these needs and other problems associated with traditional interior components and accessories. To this end, the inventors have developed an interior component and method of manufacture that is inexpensive, convenient, provides for the use of different materials, reduces quality problems and permits alternative color schemes.

Specifically, the invention comprises a component including a core portion made from a first material, and a second portion made of a second material that is integrally formed with the core portion. The first and second materials may be the same material, or may be different materials, depending on the application.

A method of manufacturing the component comprises the steps of:

injecting a first material into a mold cavity having a first volume to form a core portion of a component; and injecting a second material into the mold cavity having a second volume different than the first volume to cover a portion of the first material and form a second portion of the component while the first material is in a reactive state, whereby said first material has a different material property characteristic than said second material.

Once the second material has cured, the component is removed from the mold cavity.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
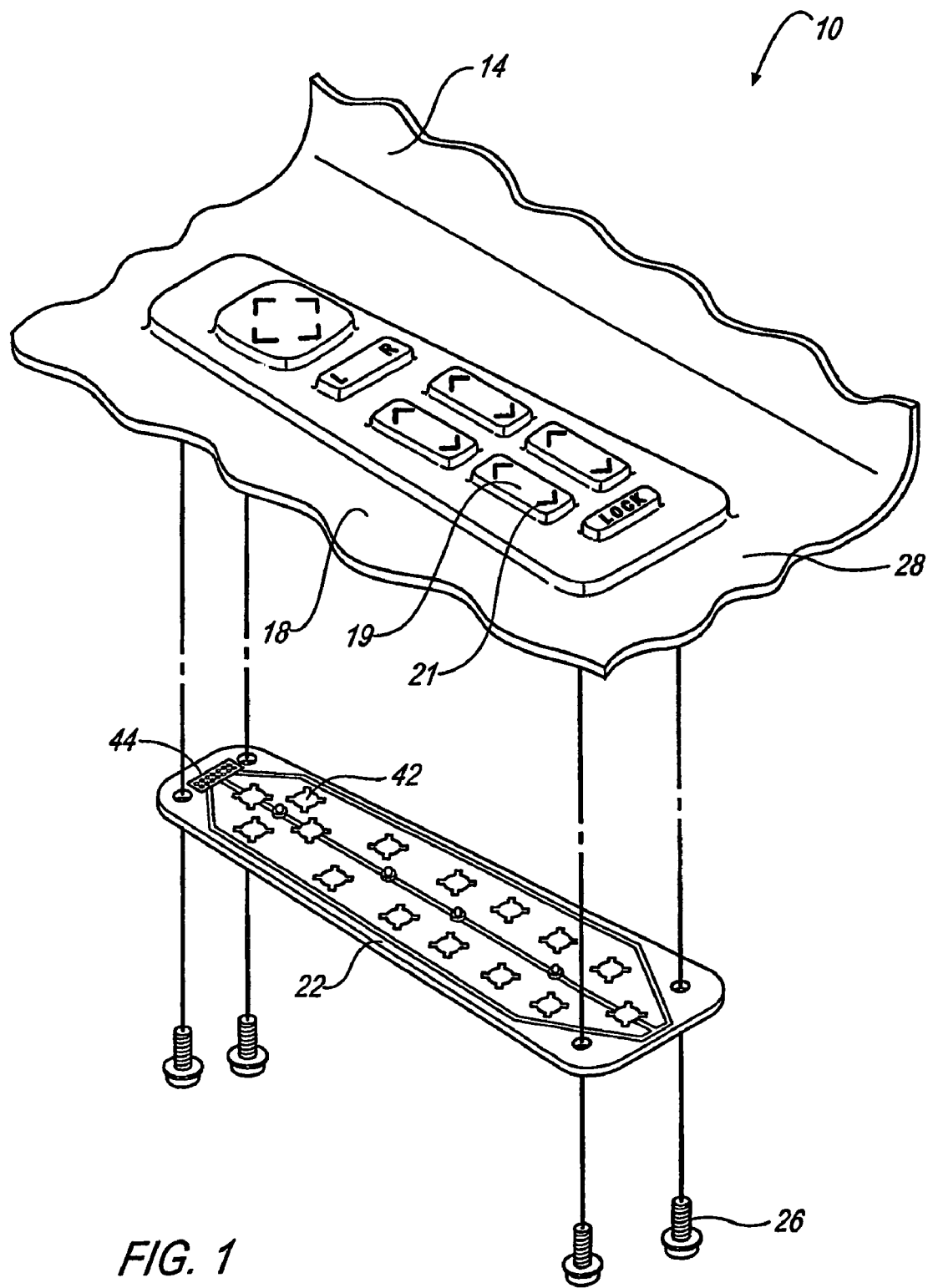
FIG. 1 is a perspective view of a switch assembly according to one embodiment of the present invention.

The invention relate to a method of manufacturing a component, generally illustrated throughout the figures at 10, using a multi-shot injection molding technique. The multi-shot molding technique uses a mold cavity (not shown) that can be altered between a first volume and a second volume. Although the subject invention involves the use of a mold cavity that can be altered from a first volume to a second volume, the invention is not limited by the number of volumes in which the mold cavity can be altered, and that the invention can be practiced with a mold cavity that be altered into any desirable number of volumes needed to form the component. In general, the mold cavity is initially positioned having the first volume for receiving a first material. Then, the first material is injected from a nozzle (not shown) of a type well-known in the art into the first volume of the mold cavity. While the first material is curing and still in a reactive state forming a core portion 14, the mold cavity is caused to move to the second volume for receiving the second material.

There are a variety of techniques that permit altering the mold cavity from the first volume to the second volume. Such techniques include the use of a moveable slide, transfer molding, core pull-back, or even the use of a rotating platen. Any technique is appropriate and the scope of the invention is not limited to a technique for altering the mold cavity from the first volume to the second volume.

Once the mold cavity has been altered from the first volume to the second volume, the second material is injected into the mold cavity from the nozzle. The second material covers at least a portion of first material while the first material is still in a reactive state to integrally form with the covered portion of the first material. Alternatively, the first material can be sufficiently cured before the second material is injected into the mold cavity. After the first and second materials have sufficiently cured, component 10 is removed from the mold cavity. Once the component 10 is removed, the mold cavity is moved or altered from the second volume back to the first volume, and the process is repeated for the manufacture of subsequent components 10.

It is preferred that the multi-shot molding technique utilizes only one nozzle for injecting first material and second material. Although only one nozzle is preferred, the method of the invention may be properly performed using more than one nozzle, for example, two nozzles; one nozzle for the injecting the first material and a second nozzle for injecting the second material.

One aspect of the multi-shot injection molding technique of the invention is that the first material and second material can be different materials or substances having different material property characteristics, such as hardness, color, conductivity, or the like. For example, the first material can be a plastic material that forms a rigid material, such as the rigid core portion 14 when cured, and the second material can be a plastic material that forms a relatively softer material when cured. In this example of the invention, once the first material is cured, a rigid core portion 14 is formed that acts as a substrate for receiving the second material. Then, the second material is injected over core portion 14 to form a second portion 18 that has a relatively softer feel when touched by a user.

It will be appreciated that the multi-shot injection molding technique of the invention can be used to vary other material property characteristics of the first and second materials. For example, the first and second materials may be of different colors to provide a two-tone color scheme, as well as being different hardness. The opportunity to use different colored materials permits a wider choice in color schemes and design of the component 10. It should be appreciated that other differences in material properties between the first and second materials are contemplated by the invention.

Figure 2:
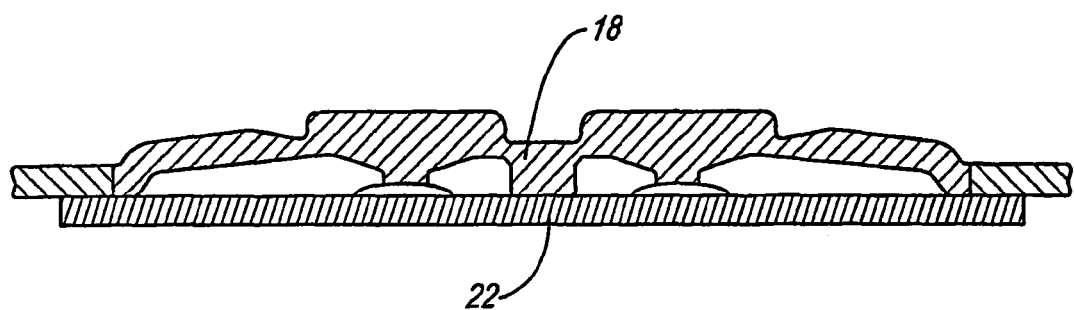
FIG. 2 is a cross-sectional view of a switch assembly in accordance with the invention.

One illustrative embodiment of the multi-shot injection molding technique of the invention is the manufacture of an accessory, such as a bezel and switch component 10, as shown in FIGS. 1 and 2. For operator convenience, switches for controlling power locks, power mirrors and power windows are traditionally positioned on an armrest 28 of a door panel. To alleviate various quality concerns with conventional switch components, the bezel and switch component 10 may be integral with the armrest 28. To integrate component 10 with the armrest 28, the multi-shot injection molding technique of the invention is utilized. Rigid core portion 14 if formed from first material and acts as a substrate to provide a supporting structure for the second portion 18. Second portion 18 includes a switch pad with a plurality of switch elements 19 for controlling power features of the accessory, such as windows, door locks, or the like. The switch elements 19 may include identifying markings 21 to ease operator identification. The switch elements 19, as part of second portion 18, are formed from the second material that forms the relatively soft-touch plastic material when cured. Accordingly, the switch elements 19 are easy to operate and are soft when touched by the user so as to provide a tactile feedback mechanism to the user.

To properly operate the switch elements 19, a circuit assembly 22 may be fastened to core portion 14. A plurality of fasteners 26 may be used to attach circuit assembly 22 to core portion 14 and also contact the switch elements 19. It should be appreciated that the invention is not limited by the fastening means for attaching the circuit assembly 22 to the core portion 14. Actuation of each switch elements 19 actuates a different portion of circuit assembly 22 that, in turn, controls a respective power feature of the accessory. This can be accomplished by, for example, the circuit assembly 22 including a plurality of contacts 42 that communicate electrically with a plurality of corresponding terminals 44. To fill the gap between switch elements 19 and contacts 42 and to form a complete circuit between switch elements 19 and contacts 42, the circuit assembly 22 may include a plurality of dome-shaped elements or "domes" (not shown) that extend outwardly from the circuit assembly 22 or switch elements 19. The dome-shaped elements may be made of electrically conductive material.

Figure 4:
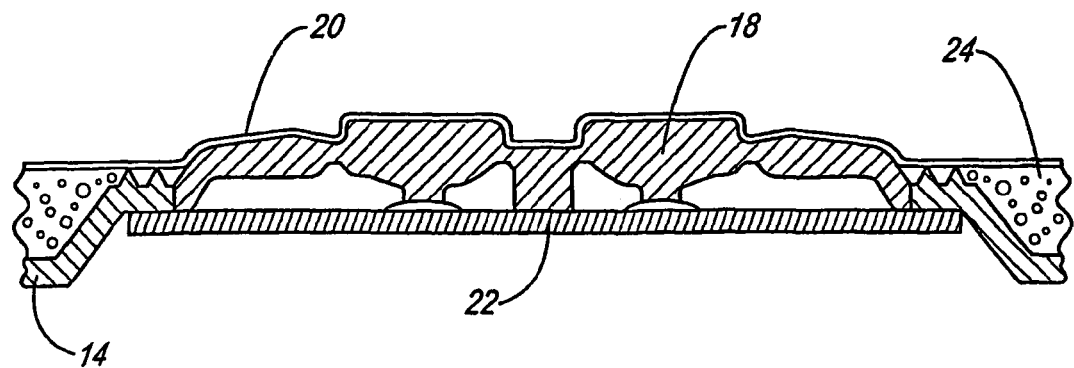
FIG. 4 is a cross-sectional view of the switch assembly of FIG. 3.
Figure 3:
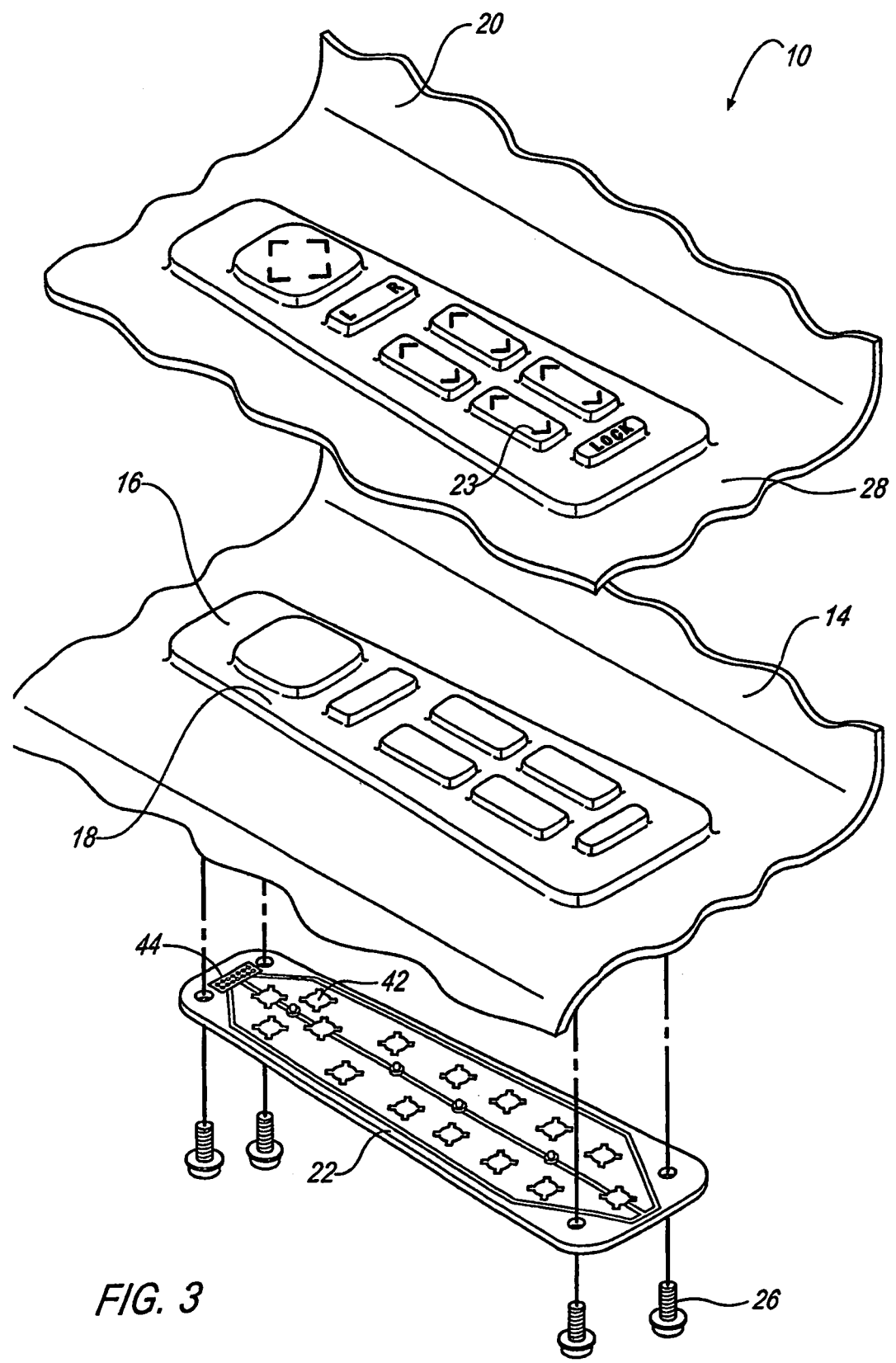
FIG. 3 is a perspective view of a switch assembly according to a second embodiment of the present invention.

A modified embodiment of bezel and switch component 10 is shown in FIGS. 3 and 4. Similar to the embodiment of component 10 shown in FIGS. 1 and 2, the second portion 18 includes a switch pad with a plurality of switch elements 19. However, the markings 21 are not separately included, unlike the embodiment of FIGS. 1 and 2. Instead, a cover 20 with integrally formed identifying markings 23 is applied over core portion 14 and second portion 18. The cover 20 may be made from spray urethane or is rotocast. The cover 20 helps to prevent the switches and circuit assembly 22 from becoming contaminated with particles of dirt and dust. One side of the cover 20 may also include foam layer 24 to provide dimension and shape to bezel and switch component 10.

Figure 5:
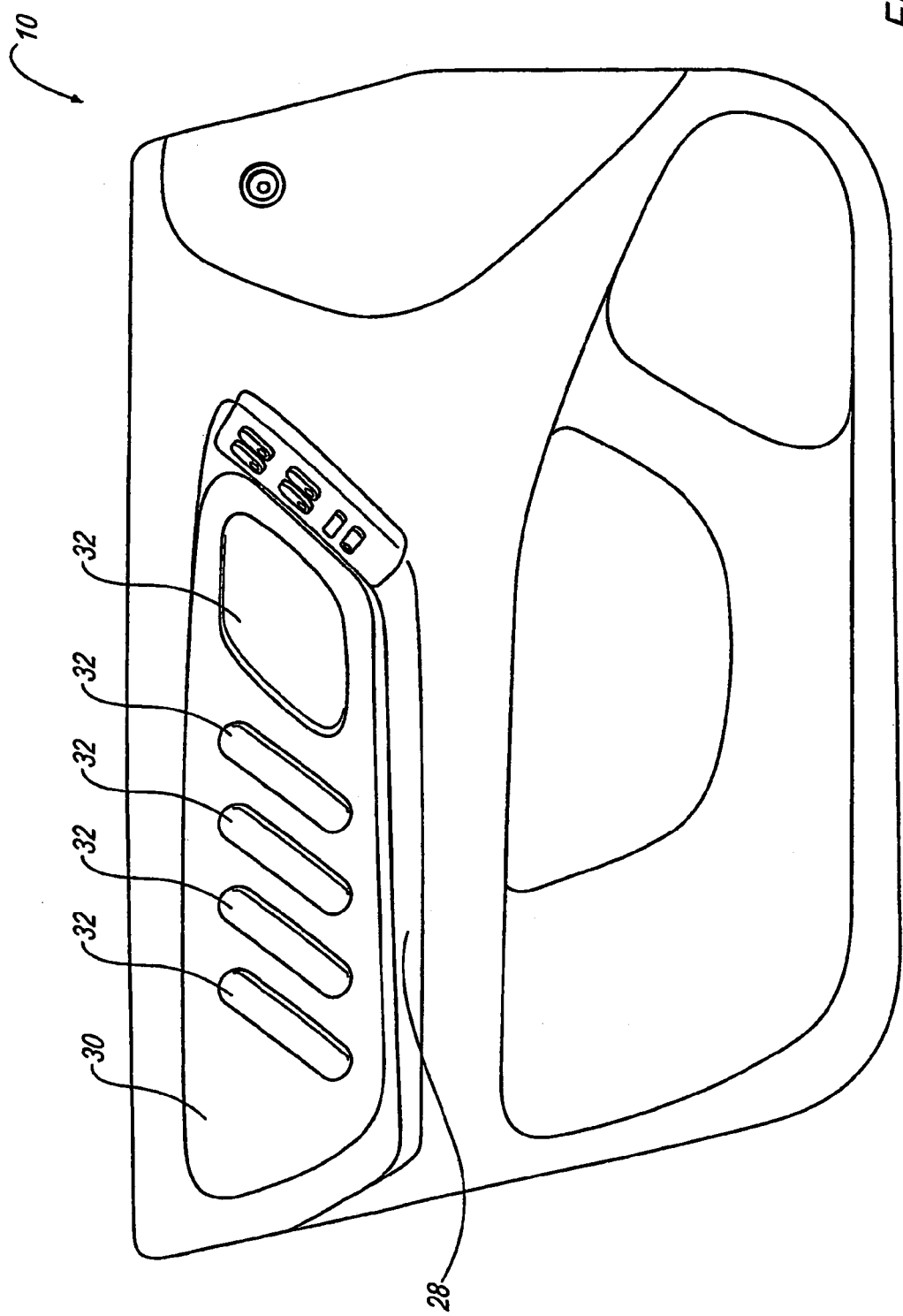
FIG. 5 is a perspective view of a door panel assembly in accordance with the invention.

Another illustrative embodiment of a component manufactured using the multi-shot molding technique of the invention comprises an interior vehicular door panel, shown generally at 10 in FIG. 5. The door panel 10 comprises an armrest 28 and a bolster 30. Both armrest 28 and bolster 30 are in frequent contact with an arm of a passenger traveling in the vehicle. Accordingly, the passenger would prefer that the contact surfaces are comfortable and soft. Use of the multi-shot molding technique of the invention achieves this objective. For example, the core portion 14 of first material can be made of a relatively rigid material for providing a support structure for the second portion 18, while second portion 18 of second material can be made from the relatively soft material, such as a soft-touch plastic material. In the illustrated embodiment, the second portion 18 forms a plurality of arm cushions 32. It will be appreciated that the core portion 14 lies underneath the second portion 18 and is hidden from view in FIG. 5. The remainder of bolster 30 and armrest 28 may be formed of a different or same material as cushions 32. The shape and quantity of the cushions 32 are not limited to the illustrations and may also be included on the armrest 28. Cushions 32 provide a soft, comfortable feel to the arm of the passenger. Additionally, the second material may be of a different color. In this manner, cushions 32 would also provide a contrast in the interior trim design.

It should be understood that embodiment described above is illustrative of a preferred embodiment of the subject invention. The subject invention is applicable to various other alternative embodiments. The scope of the invention is not limited to door panels, interior trim or automotive applications. It is intended that the following claims define the scope of the invention and that the method and apparatus within the scope of these claims and their equivalents be covered thereby.

The invention claimed is:

1. A method for manufacturing an accessory for an interior trim door panel of a vehicle, comprising the steps of:
    forming a bezel and switch component that is integral with an armrest of said interior trim door panel by way of a multi-shot molding technique, wherein the bezel and switch component that is integrally-formed with the armrest includes
        a rigid core portion that forms an opening, wherein the rigid core portion provides a base substrate, wherein the rigid core portion is formed by the multi-shot molding technique by injecting a first material into a first mold cavity that defines a first volume to form a first surface having sidewalls that define said opening, and
        a switch pad portion bonded to the opening of the rigid core portion, wherein the switch pad portion includes a plurality of tactile-feedback switch elements each extending outwardly and away from a top surface of the switch pad portion, wherein each tactile-feedback switch element of the plurality of tactile-feedback switch elements is associated with operation of one or more power features of one or more vehicular accessories, wherein the switch pad portion including the plurality of tactile-feedback switch elements is formed by the multi-shot molding technique by injecting a second material into a second mold cavity that defines a second volume and forming a second surface that is directly bonded to said first surface and closes out said opening;
    applying a cover over at least a portion of the switch pad portion; and
    dispensing a foam layer between said cover and said rigid core portion.

2. The method according to claim 1, where said second material includes at least one differing characteristic in comparison to said first material, wherein said first material and said second material define a functional relationship, wherein said differing characteristic between said first material and said second material is that said first material has a rigid, armrest support characteristic for supporting a limb of a person and said second material has a flexible characteristic for permitting the top surface of the switch pad portion to be depressible.

3. The method according to claim 2, further comprising the steps of:
    providing a circuit assembly; and
    attaching the circuit assembly to the rigid core portion, wherein the circuit assembly includes a plurality of contacts that electrically communicate with a plurality of corresponding terminals for controlling said one or more vehicular accessories, wherein each contact of said plurality of contacts is aligned with a corresponding tactile-feedback switch element of said plurality of switch elements, wherein engagement of one of the corresponding tactile-feedback switch element with one of the contacts of the plurality of contacts forms a complete circuit for permitting control over said one or more vehicular accessories.

4. The method according to claim 1, wherein at least a portion of one or both of said first surface and said second surface define an exterior surface of said interior trim door panel such that they are externally visible as installed within a vehicle.

5. The method according to claim 1, wherein at least a portion of both said first surface and said second surface define an exterior surface of said interior trim door panel such that they are externally visible as installed within a vehicle.

6. The method according to claim 1, wherein said first mold cavity that defines the first volume and said second mold cavity that defines the second volume are the same mold cavity.

7. The method according to claim 1, wherein said second surface is attached to said sidewalls of said first surface.

8. The method according to claim 1, wherein said first surface is mechanically interlocked to said second surface.

9. The method according to claim 1, wherein said step of injection of said second material is subsequent to said step of injection of said first material.

10. The method according to claim 1, wherein said second material is injected when said first material is sufficiently cured.

11. The method according to claim 2, wherein said differing characteristic between said first material and said second material is that said first material is a rigid material that forms a plastic support material, and wherein said second material is a flexible material that forms a soft-touch plastic material.

12. The method according to claim 1, wherein a material of said cover is selected from the group consisting of a spray urethane material and a rotocast material.

13. The method according to claim 1, wherein said cover includes integrally-formed identifying markings that identifies functional control over said one or more vehicular accessories.

14. The method according to claim 1, wherein each tactile-feedback switch element of the plurality of tactile-feedback switch elements includes identifying markings that identifies functional control over said one or more vehicular accessories.

15. A method for manufacturing an accessory for an interior trim door panel of a vehicle, comprising the steps of:
    forming a bezel and switch component that is integral with an armrest of said interior trim door panel by way of a multi-shot molding technique, wherein the bezel and switch component that is integrally-formed with the armrest includes
        a rigid core portion that forms an opening, wherein the rigid core portion provides a base substrate, wherein the rigid core portion is formed by the multi-shot molding technique by injecting a first material into a first mold cavity that defines a first volume to form a first surface having sidewalls that define said opening, and
        a switch pad portion bonded to the opening of the rigid core portion, wherein the switch pad portion includes a plurality of tactile-feedback switch elements, wherein the plurality of tactile-feedback switch elements extend away from a top surface of the switch pad portion, wherein the plurality of tactile-feedback switch elements extend away from and are non-planar with an upper surface of the rigid core portion, wherein each tactile-feedback switch element of the plurality of tactile-feedback switch elements is associated with operation of one or more power features of one or more vehicular accessories, wherein the switch pad portion including the plurality of tactile-feedback switch elements is formed by the multi-shot molding technique by injecting a second material into a second mold cavity that defines a second volume and forming a second surface that is directly bonded to said first surface and closes out said opening;

attaching a cover to the bezel and switch component, wherein the cover is disposed over the plurality of tactile-feedback switch elements, the top surface of the switch pad portion and the upper surface of the rigid core portion; and attaching a circuit assembly to the rigid core portion, wherein the circuit assembly includes a plurality of contacts that electrically communicate with a plurality of corresponding terminals for controlling said one or more vehicular accessories, wherein each contact of said plurality of contacts is aligned with a corresponding tactile-feedback switch element of said plurality of switch elements, wherein engagement of one of the corresponding tactile-feedback switch element with one of the contacts of the plurality of contacts forms a complete circuit for permitting control over said one or more vehicular accessories.

16. The method according to claim 15, wherein one or more regions of the cover that are aligned with one or more of the plurality of tactile-feedback switch elements includes an integrally-formed identifying marking that identifies functional control over said one or more vehicular accessories.

* * * * *